United States Patent

[11] 3,630,758

| [72] | Inventor | Charles C. Despain |
| | | Oroville, Wash. |
| [21] | Appl. No. | 777,148 |
| [22] | Filed | Nov. 19, 1968 |
| [45] | Patented | Dec. 28, 1971 |
| [73] | Assignee | Hemisphere Harvesters, Inc. |
| | | Oroville, Wash. |

[54] FRUIT HARVESTING TECHNIQUE
3 Claims, No Drawings

[52] U.S. Cl. .................................................. 99/168,
47/2, 56/1, 56/328 TS
[51] Int. Cl. ................................................. A23b 7/00
[50] Field of Search............................................. 99/168,
154; 117/33; 260/2.5; 47/2; 56/1, 328 TS

[56] References Cited
UNITED STATES PATENTS

| 1,955,950 | 4/1934 | Copeman ...................... | 99/168 X |
| 2,275,659 | 3/1942 | Steinle et al. .................. | 99/168 X |
| 2,703,760 | 3/1955 | Cunning........................ | 99/168 |
| 2,950,976 | 8/1960 | Kher............................. | 99/168 X |
| 3,069,274 | 12/1962 | Concannon ................... | 99/154 X |
| 3,189,467 | 6/1965 | Kalmar.......................... | 99/168 |
| 3,304,219 | 2/1967 | Nickerson ..................... | 117/33 X |
| 3,387,405 | 6/1968 | Iwasyk et al. .................. | 260/2.5 X |
| 1,995,853 | 3/1935 | Hunsaker...................... | 47/2 UX |
| 2,875,555 | 3/1959 | Thiegs et al................... | 47/2 X |
| 3,045,394 | 7/1962 | Coulter ......................... | 47/2 X |
| 3,460,329 | 8/1969 | Overstreet, Jr. .............. | 56/328 TS |
| 3,492,250 | 1/1970 | Deyrup......................... | 260/17.4 X |

FOREIGN PATENTS

| 228,438 | 6/1960 | Australia ...................... | 99/168 |

OTHER REFERENCES

The Condensed Chemical Dictionary, Reinhold, 6th Ed., Cpr. 1961, pps. 515 and 922.

*Primary Examiner*—Tim R. Miles
*Attorney*—Graybeal, Cole & Barnard

ABSTRACT: The method of harvesting apples comprising coating the apples in situ on the tree with a cushioning material, preferably a polymer froth foam, such as a mixture of hydrolyzed polyvinyl alcohol, polyvinyl alcohol, water, and trichloromonofluoromethane (Freon 11), shaking the trees to release the apples from the tree, and collecting the apples with the cushioning material still intact. In addition, the foam may remain on the apples during handling and storage to reduce bruise damage during processing after harvesting.

FRUIT HARVESTING TECHNIQUE

BACKGROUND OF THE INVENTION

1. Field of the Invention

This invention relates to harvesting techniques for fruit and other edibles that are easily damaged by physical contact and, more particularly, to a technique for protecting apples during harvesting, storing and subsequent handling.

2. Description of the Prior Art

Heretofore many edible fruits particularly apples which have an easily damaged skin membrane, have been harvested exclusively by handpicking. Mechanical harvesting has not been feasible even where a protective cushion is laid on the ground since the apples may also be damaged by striking other apples or tree branches. Handpicking is, of course, slow and costly. Furthermore because the work is difficult and seasonal it is becoming increasingly more difficult to obtain sufficient labor when the fruit is ready to harvest.

SUMMARY OF THE INVENTION

This invention is directed to a method of treating easily damaged fruit and the like to adapt them for mechanical harvesting. Basically it employs the technique of coating the fruit with a cushioning material, such as a froth foam or the like, in situ on the tree, followed by mechanically shaking and mechanically collecting the fallen fruit. In addition, the same principles may be employed either to treat harvested fruit for subsequent handling or the cushioning material already applied in situ on the tree may be left on the fruit through subsequent handling and storage until the fruit is ready for marketing. Still another feature is that the cushioning material may contain a spoilage retardant, insecticide, or the like.

DESCRIPTION OF THE PREFERRED EMBODIMENT

In applying a cushioning material, such as a protective foam, to the apples before they are removed from the tree, several factors must be considered. The coating material must adhere to the fruit; it must be easily removable from the fruit and the tree and thus preferably, although not necessarily, should be water soluble; it must be acceptable to the United States Food and Drug Administration and state regulatory agencies; it must not degrade the quality of the fruit, such as by changing skin color or texture; and of less importance it must be economically competitive with the cost of handpicking.

Formulations of a suitable foam are presently available, two examples of which are given hereinbelow:

Example I (Parts by weight)

5 parts fully hydrolyzed polyvinyl alcohol 71–30
5 parts polyvinyl alcohol 76–50
75 parts water
15 parts trichloromonofluoromethane (Freon 11)

The coating is achieved by spraying the apples with the above mixture from a conventional froth sprayer such as used for applying wall covering compositions or applying fire retardant foam to aircraft runways.

On a smaller scale the coating of example I has been applied by spreading it on the apples with a spatula to a thickness of one-eighth to one-fourth of an inch. After drying (about an hour) the apples withstood 3 foot drops onto concrete with an apparent considerably smaller incidence of bruising.

Example II (Parts by weight)

15 parts polyvinylpyrrollidone
85 parts water

The coating of example II is achieved by spraying the apples in situ with the polyvinylpyrrollidone and water adhesive solution and then coating the polymer solution with preexpanded polystyrene beads (about three-sixteenths inch in diameter) preferably by blowing or throwing the beads onto the apples on a tree. Conventional insecticides sprayers may be used for the polymer spray and suitable blowers for the beads.

On a smaller scale apples were coated with the adhesive by the use of a hand sprayer and beads were thrown on the coated apples. Apples thus covered with the coating of example II also withstood drops of 3 feet onto concrete with a smaller incidence of bruising.

In both of the above examples it is not necessary that the apple be completely covered. Since much of the damage occurs due to the stem of one apple penetrating the skin of another apple, it is desirable that the area surrounding the stems be adequately coated. Of course, a complete coating is preferred as this will fully protect the apples from all other forms of physical contact. It is economical to harvest apples even where the protective coating is not completely surrounding the entire apple since the number of apples that are damaged during the fall due to the infrequent incidence of two apples coming together at the uncovered areas of each is small enough that damaged apples may be removed or culled by hand from the remaining apples.

The apples after being coated may be removed from the tree either by handpicking or preferably by shaking the tree with conventional tree-shaking equipment. When tree-shaking equipment is employed the apples are shaken onto a collecting pad or canvas sheet, as is well known in the art, and gathered for packing into boxes. After harvesting, the apples with their protective coatings intact are either shipped to processing plants where the coatings are washed from the fruit or are shipped to storage areas and held until a more desirable processing time. Since apples are generally cleaned and polished prior to shipping to a market area, the protective coating may be removed at this time. If desired, the protective coating may remain on the fruit until delivered to the retail store where it would be removed with tap water.

The protective coating may also be soluble in a solute other than water and be removed prior to the washing operation in conventional commercial processing equipment. Insecticides, fungicides, additives to retard spoilage, or the like, may also be added to the form.

While two examples of a suitable protective material have been described, it should be understood that the coating materials are not limited to these examples but that variations will be readily apparent to those skilled in the art. It should also be understood that although the method is particularly adapted to harvesting apples, other fruit and vegetables may also be harvested using this technique.

What is claimed is:

1. A method of harvesting easily damaged fruit or the like, comprising: spraying the fruit in situ before harvesting with an adhesive and disposing preexpanded beads onto the adhesive coated fruit; mechanically removing the fruit from the plant with the coating remaining thereon; and collecting the removed fruit.

2. A method of protecting easily damaged fruit during harvesting with cushioning material protective against damage by physical contact comprising:
   spraying the fruit in situ before harvesting with an adhesive of 15 parts polyvinylpyrrollidone; 85 parts water; and
   blowing of the fruit and securing to the adhesive a layer of preexpanded polystyrene beads.

3. In combination:
   a tree;
   a ripened fruit on said tree; and
   a cushioning material including an adhesive mixture incorporating preexpanded beads covering at least a portion of said fruit.

* * * * *